United States Patent [19]

Sygnator

[11] Patent Number: 4,583,898
[45] Date of Patent: Apr. 22, 1986

[54] DRILL SCREW AND CUTTERS FOR MAKING SAME

[75] Inventor: Henry A. Sygnator, Arlington Heights, Ill.

[73] Assignee: Illinois Tool Works Inc., Chicago, Ill.

[21] Appl. No.: 473,524

[22] Filed: Mar. 15, 1983

Related U.S. Application Data

[63] Continuation of Ser. No. 97,460, Nov. 26, 1979, abandoned.

[51] Int. Cl.[4] .............................................. F16B 25/00
[52] U.S. Cl. ...................................... 411/387; 411/421; 408/230
[58] Field of Search ..................... 411/386, 387, 421; 408/226-230

[56] References Cited

U.S. PATENT DOCUMENTS

| | | | |
|---|---|---|---|
| 1,294,268 | 8/1915 | Holmes | 411/421 |
| 3,125,923 | 3/1964 | Hanneman | 411/386 |
| 3,241,426 | 3/1966 | Gutshall | 411/387 |
| 3,395,603 | 8/1968 | Skierski | 411/387 |
| 3,463,045 | 8/1969 | Prescott | 411/387 |
| 3,738,218 | 6/1973 | Gutshall | 10/10 R X |
| 3,747,143 | 7/1973 | Eager | 411/387 |
| 3,780,389 | 12/1973 | Lindstrom | 10/10 R |
| 3,786,713 | 1/1974 | Sygnator | 411/387 |
| 3,789,725 | 2/1974 | Lindstrom | 411/387 |
| 3,933,075 | 1/1976 | Peterson | 411/387 |
| 4,064,784 | 12/1977 | Adler | 411/387 |
| 4,114,508 | 9/1978 | Jeal | 411/387 |
| 4,138,754 | 2/1979 | Baer | 10/9 X |
| 4,222,689 | 9/1980 | Fujiwara | 411/387 |
| 4,241,639 | 12/1980 | Baer | 411/387 |

FOREIGN PATENT DOCUMENTS

| | | | |
|---|---|---|---|
| 2827784 | 2/1979 | Fed. Rep. of Germany | 411/387 |
| 26071 | of 1913 | United Kingdom | 411/902 |

OTHER PUBLICATIONS

"How Much from Special Drill Shapes"; Oxford, Carl, Jr.—Modern Machine Shop; Oct. 1975, pp. 100–105.
"Holemaking Hangups? Drill Points Make the Difference"; Johnson, William A.;—Machine and Tool Blue Book, Jul. 1979, pp. 108–120.

Primary Examiner—Kenneth J. Dorner
Assistant Examiner—Neill Wilson
Attorney, Agent, or Firm—David I. Roche; Thomas W. Buckman

[57] ABSTRACT

A self-drilling and self-tapping screw with a compound flute configuration having a straight portion including at least part of the cutting edge and a curved portion defining the drag surface. Generally convex point configurations having uniformly radiused heels or, alternatively, heels formed by two planar surfaces intersecting to enclose an obtuse angle less than 180 degrees are also disclosed. Fluting cutters and pointing cutters for making this screw as well as a general description of the method of making the screw have been set forth in the instant application.

7 Claims, 17 Drawing Figures

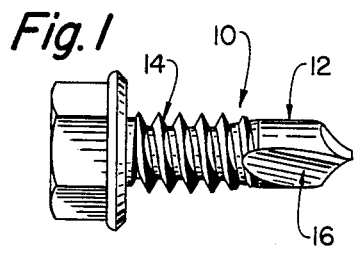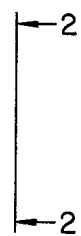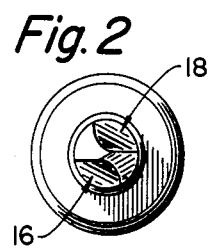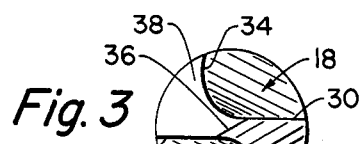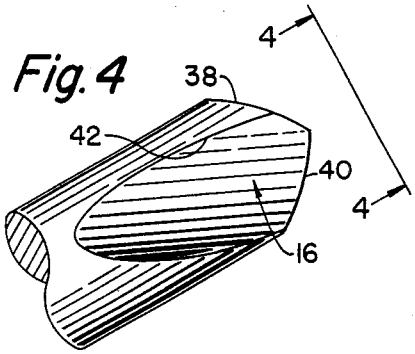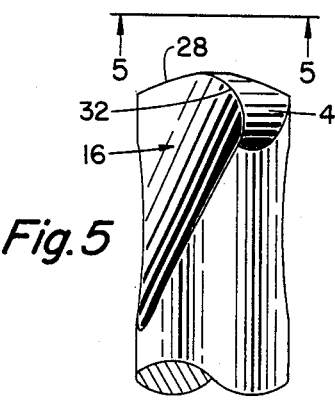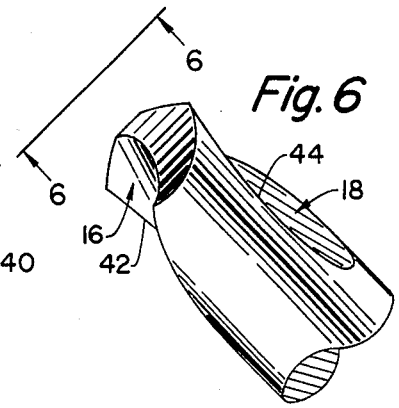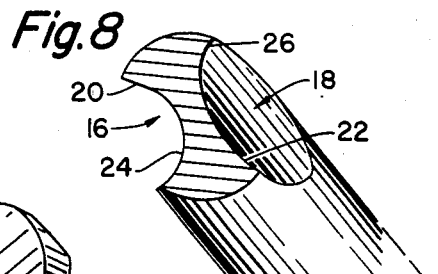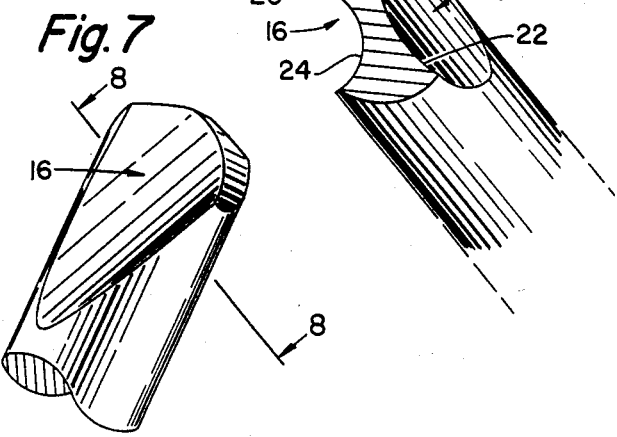

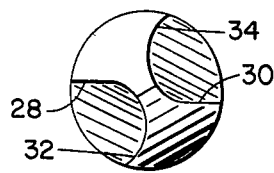
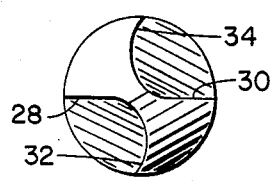
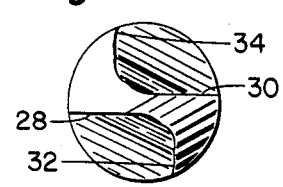
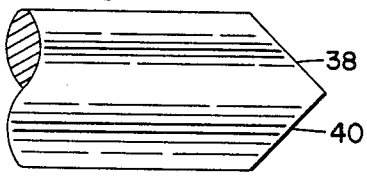
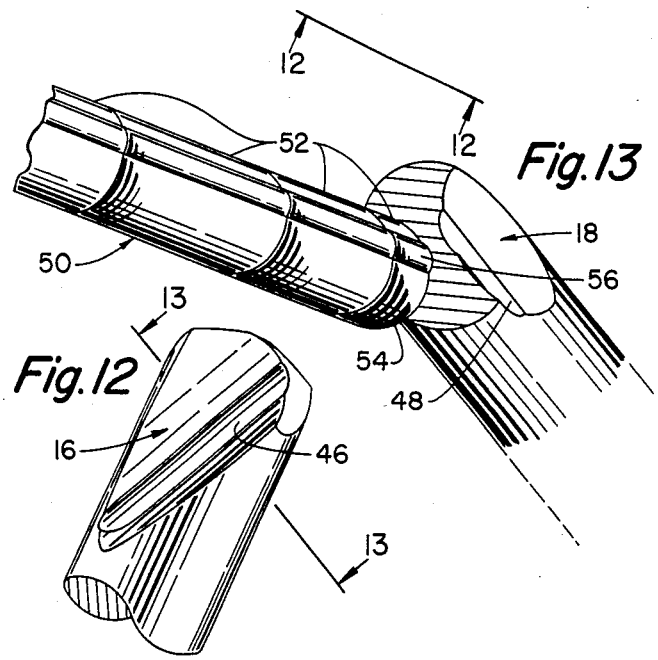
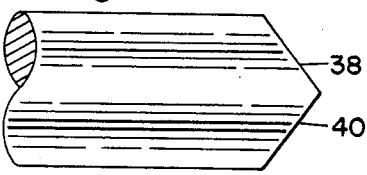
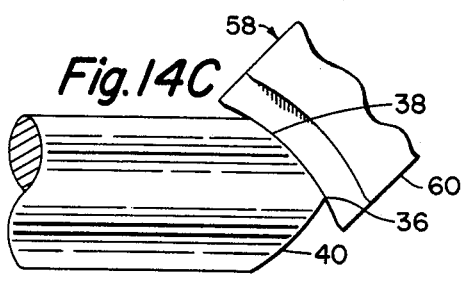
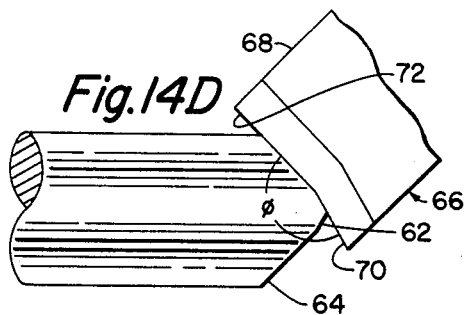

DRILL SCREW AND CUTTERS FOR MAKING SAME

This application is a continuation, of application Ser. No. 97,460, filed 11/26/79 now abandoned.

BACKGROUND AND SUMMARY OF THE INVENTION

The present invention relates to a novel drill screw which is capable of improved performance and to cutters for making it.

Many different drill screw configurations have been developed to date. Designing of these drill screws has been something less than an exact science with the reasons why some drill screws work well in some materials, but not in others, and why other drill screws do not work well at all, remaining something of a mystery. For example, it is known that for some applications, a simple nail point when turned at a sufficient rate of speed is sufficient to penetrate some materials, dry wall for example. On the otherhand, no drill screw yet devised can satisfactorily drill through some of the high strength, low-alloy steels.

Two of the basic criteria used to judge drill screw performance are; (1) the amount of end-pressure load required for the screw to drill and (2) the time in seconds for the screw to penetrate the particular material being drilled. Obviously, in an assembly line type environment where a large number of fasteners are installed by a workman in an hour's time, reduction in both the amount of end loading required and drill time will be of benefit to both the individual workman and to his employer.

Therefore, it is an object of the present invention to provide a drill screw capable of drilling with lower end-pressure load.

It is a further object to provide a drill screw that can drill in a shorter period of time even though the end load is reduced.

Further, it is an object of the present invention to provide a drill screw which is capable of drilling high-strength, low-alloy steels.

In addition, it is an object of the present invention to provide an improved method of producing a drill screw which leads to greater consistency of the product.

A further object of the invention is to provide a cutter capable of milling a drill screw flute having a chip-breaking feature.

It is yet another object of the present invention to provide a cutter for pointing a drill screw which is capable of producing a point which has a generally convex configuration. This generally convex configuration may have a uniform radius or be formed by two planes intersecting to form an obtuse included angle which is less than 180°, preferably about 172½°.

These and other objects of the invention are accomplished by a drill screw which has a compound flute configuration; that is, a flute which has both a straight section and a curverd section, the radius of this curved section being uniform in a plane perpendicular to the axis of the flute. The straight section includes at least a portion of the cutting edge and the curved section includes at least the trailing or drag surface. In some embodiments, the curved section also includes part of the cutting edge (defined as that portion of the leading end of the flute which is in advance of the chisel).

The drill screw of the present invention is manufactured using radiused cutters rather than the conventional fluting and pointing saws. One of the chief benefits of using radiused cutters is that, unlike conventional saws, when the teeth are sharpened, little or no material is removed from the diameter. Hence, the optimum flute configuration becomes more readily reproduced (i.e., there is less variance in quality due to wearing of the cutter). A further advantage, which also adds to part consistency, is that the teeth have a stronger configuration which is less subject to deflection.

In the manufacture of these drill screws, the fluting cutters are simultaneously plunged into the shank of the screw blank along axes which are parallel, but offset. The longitudinal axis of the cutters are inclined at equal but opposite acute angles relative to the axis of the blank as the cutters are moved along the parallel axis of movement. As a result, the flute has a straight section corresponding to the side of the cutter and a radius corresponding to the tip radius of the cutter teeth.

The drill screw may be provided with any of the conventional 90° or 105° point angles or, may be formed by a cutter which has a generally concave tooth configuration. This will produce a generally convex point, each portion of which may have a uniform radius of curvature or be formed by a pair of planar surfaces which intersect to form an included angle of 172½°. In this latter instance the drill point will have a compound included angle which may be 105° at the tip and 90° elsewhwere.

The drill screw of the present invention has a stronger cutting edge which makes it less likely to break down when drilling the harder materials. At the same time, by maintaining a comparatively narrow chisel, the end pressure required to effect drilling can be kept to a minimum.

These and other objects, features and advantages of the present invention will be better understood by referring to the following detailed description taken in conjunction with the accompanying drawings.

BRIEF DESCRIPTION OF THE DRAWINGS

FIG. 1 is a side elevation of a self-drilling, self-tapping screw embodying the present invention;

FIG. 2 is an end view of the drill screw of one embodiment of the present invention taken along line 2—2 of FIG. 1;

FIG. 3 is an enlargement of the drill point shown in FIG. 2;

FIG. 4 is a side elevation of the drill point taken perpendicular to the chisel or along line 4—4 in FIG. 3;

FIG. 5 is a side elevation taken parallel to the cutting edge or along line 5—5 of FIG. 3;

FIG. 6 is a side elevation taken along line 6—6 of FIG. 3, a line parallel to the chisel;

FIG. 7 is a side elevation taken along line 7—7 of FIG. 3;

FIG. 8 is a sectional view taken along line 8—8 of FIG. 7, a line which is perpendicular to the axis of one of the flutes;

FIG. 9 shows an end view of a slightly varied form of the present invention in which the cutting edges are beyond center (i.e., both extend beyond the same diametral plane);

FIG. 10 is another alternate embodiment in which the cutting edges are generally coaxial (i.e., on center);

FIG. 11 shows an end view of an embodiment of the present invention which has a chip-breaking feature;

FIG. 12 is a side elevational view of the FIG. 11 embodiment taken along line 12—12;

FIG. 13 is a sectional view taken along line 13—13 of FIG. 12 and showing the fluting cutter with which it is made;

FIG. 14A is a non-fluted blank with a 90° point angle;

FIG. 14B is a side elevational view of a standard 105° point angle;

FIG. 14C is a side elevational view of one form of the generally convex point showing the configuration of the cutter for forming same; and FIG. 14D is a side elevational view of an alternate form of the generally convex point each heel thereof formed by a pair of angulated surfces and showing the tooth configuration of the cutter for forming this point.

DETAILED DESCRIPTION OF THE INVENTION

The self-drilling, self-tapping fastener of the present invention is shown generally at 10. FIGS. 1-8 show a plurality of views of the preferred embodiment in order that the precise configuration of the drill tip 12 can be fully appreciated. The self-tapping thread 14 may take any convenient form.

The drill tip 12 of the present invention is formed using radiused cutters for both fluting and pointing in place of the conventional saws, some what in the manner taught by U.S. Pat. No. 3,933,075. The fluting cutters (not shown) are positioned on either side of the screw blank with their longitudinal axes at equal opposite angles (generally on the order of 15°) with respect to the axis of the blank. Unlike the technique shown in U.S. Pat. No. 3,933,075 where the cutters are plunged into the blank with their axes extending radially there into, to form a uniformly radiused flute, in forming the flutes 16 and 18 of the screw 10 of the present invention, the cutters are plunged into the blank so that their side edges impart a straight portion 20 and 22 (see FIG. 8) to each of the flutes. Each flute then has a compound configuration which includes a straight portion 20, 22 and a radiused portion 24, 26. In the preferred embodiment these straight portions 20, 22 include the cutting edges 28 and 30 while the radiused portions 24 and 26 include trailing or drag surfaces 32 and 34. The center lines of the cutters are above the end of the blank so that the thinnest portion of the web will be back of point.

A chisel 36 is formed by the intersection of heel portions 38 and 40. Chisel 36 forms an acute angle with each of the cutting edges 28 and 30 on the order of thirty degrees. The configuration of the cutting edges 28, 30 and drag surfaces 32, 34 as they are seen in FIGS. 2 and 3 are necessarily the summation of the effects of the flutes 16 and 18 and the slabbing of heel portions 38 and 40.

In order to show the actual configuration of the flute absent the effects of the point, FIG. 8 depicts a cross section taken along line 8—8 of FIG. 7, a line which is perpendicular to the axis of flute 16. Flat surface 20 is past, or below the radial center line (hereafter "below center") which is parallel to the two cutting edges 28 and 30. This is due to the inclination of the flutes 16 and 18 relative to the longitudinal axis of the screw. The radiused portion 24 has a uniform radius of curvature in this plane corresponding to the radius of the cutter which formed it. Line 8—8 is, of course, not perpendicular to the axis of flute 18 but is, rather, sloped at a 30° angle relative thereto. FIG. 8, then, serves as a dramatic indication of the impact the superposition to the point can have on the end view of the fastener.

Another feature of the flute configuration is shown in FIG. 6. The intersection of the angulated cutters with the cylindrical periphery of the shank results in curved leading edges 42 and 44 of the flutes 16 and 18. This, in conjunction with the circular configuration of the cutter, produces a scoop like configuration in the vicinity of cutting edges 28 and 30. This scoop shape, may result in the fastener pulling itself into the drilled hole, thereby, at least partially accounting for the fastener's phenomenal drilling capabilities.

One effect of the configurations of heel portions 38 and 40 and flutes 16 and 18 and the scoop-like configuration produced by the circular configuration of the cutter, as described above, is the included angle of each of the cutting edges 28 and 30 which is defined respectively by the flutes 16 and 18 and the heel portions 38 and 40 is an acute angle which varies over the length of the cutting edges 28 and 30 with the most acute value of that angle occurring at the outermost ends of cutting edges 28 and 30.

Although the preferred embodiment depicts a configuration in which the cutting edges are above center, it will be appreciated that by decreasing the depth of the cutters' plunge and moving the cutters laterally, both a below center and an on center condition can be achieved. These alternate configurations are depicted in FIGS. 9 and 10, respectively. In these embodiments, the curved portions 32 and 34 of the flutes include part of the cutting edges 28 and 30 thereby giving the cutting edges a compound configuration. In these alternative embodiments it is important to maintain a relatively short chisel length in order to insure that lower end-pressure is needed to initiate drilling.

FIGS. 11-13 depict yet another aspect of the present invention. To date, chip-breaking features have only been added to forged-point drill screws. With the present invention, shallow troughs 46 and 48 extend longitudinally in each milled flute 16 and 18. This chip-breaking feature is milled by cutter 50 (FIG. 13). Cutter 50 has a plurality of teeth 52 (preferably a 20 or 32 tooth cutter is used). Each tooth 52 has a profile comprised of a uniform first radiused portion 54 and an arcuate rib 56 having a second shorter radius. The rib 56 may be offset from the axial center line one direction or the other depending on the flute configuration desired. Although only the above center configuration has been shown, it will be appreciated that the chipbreaking trough could also be added to the below center and on center configurations depicted in FIGS. 9 and 10. Further, it will be understood that the cutter configuration can be modified to move the ribs across the face of the radiused tooth in order to vary the position of the trough within the flute to place the chip breaker on either side of the chisel.

As previously mentioned, the end view of the drill screw 10 (as shown in FIGS. 3, 9, 10) and the performance of the screw will vary depending on the particular point added to the blank. Thus, it may be that one point will out perform another in a first material but not in a second material. However, preliminary testing indicates that the generally convex point depicted in the preferred embodiment and shown in FIG. 14C consistently outperforms other point geometries when combined with the flute configuration previously discussed. To form this generally convex point, a first cutter (not shown) having concave teeth is used to slab off a generally triangular portion of the blank following fluting to form heel region 40 and then a second cutter 58 with concave teeth 60 forms heel portion 38 and chisel 36.

An alternative generally convex point form is shown in FIG. 14D. In this embodiment the heel portions are each configured by a pair of planar surfaces 62 and 64 which form an obtuse included angle. The generally convex point of this embodiment is again, formed by a pair of cutters 66 (one of which is shown) which have teeth 68 having a periphery formed as two angular portions 70 and 72. These angular portions define an obtuse angle $\phi$ which is generally equal to the angle to be formed on the drill screw. Preferably both of these obtuse angles equal $172\frac{1}{2}°$ (as measured internally on the drill screw and externally on the cutter). In this manner, the point formed by surfaces 62 will have an enculded angle which is 15° greater than that formed by planar surfaces 64, 105° as opposed to 90°, for example. Of course conventional single angle drill points such as 90° (FIG. 14A) and 105° (FIG. 14B) can be used on this screw as well and may prove advantageous for certain applications.

Various changes, modifications and variations will become apparent to persons of ordinary skill in the art in view of the foregoing disclosure. For example, the generally convex point of FIG. 14C could have a lesser or greater included angle by shifting the axis of cutter 58 with respect to the axis of the blank. Further, with regard to the drill point of the present invention, it is conceivable the configuration taught herein could be formed by forging. Accordingly, it is intended that the present invention encompass all such changes, modifications and variations as fall within the scope of the appended claims.

Therefore, I claim:

1. A milled self-drilling fastener having a drilling tip at one end of the fastener shank, said tip comprising a pair of flutes extending at equal opposite angles with respect to the axis of said fastener lying generally on opposite sides thereof, a pair of heel portions extending intermediate said flutes, said heel portion intersecting to define a narrow chisel edge, said heel portions having convex curvature in a direction perpendicular to said chisel edge, and substantially no curvature in a direction parallel to said chisel edge, said flute defining a cutting edge and a drag surface, said heel portions being configured in substantially immediately increasing cross-sections in planes parallel to the axis of the fastener as distance along said planes from said axis increases thereby buttressing said cutting edge and enhancing resistance of said tip to breaking during drilling, each said flute having a compound configuration formed by a flat surface section extending inwardly from the outer edge of the shank and intersecting at least a portion of the cutting edge and a curved section including at least said drag surface, said curved section having a substantially uniform radius of curvature in a plane perpendicular to the axis of the flute.

2. The self-drilling fastener of claim 1 wherein said curved section includes a portion of said cutting edge.

3. The self-drilling fastener of claim 1 wherein the two cutting edges have straight portions which generally extend along a common center line.

4. The self-drilling fastener of claim 1 wherein the flutes occupy an area greater than a full quadrant, each cutting edge has a straight portion extending beyond a diametral plane passing through both flutes.

5. The self-drilling fastener of claim 1 wherein each cutting edge has a straight portion which lies adjacent, but does not cross, a diametral plane.

6. The self-drilling fastener of claim 3, 4 or 5 wherein each flute includes a chipbreaking feature.

7. The self-drilling fastener of claim 6 wherein the chipbreaking feature comprises a shallow channel extending the length of and generally, parallel to the axis of, the flute.

* * * * *